US012444984B2

(12) United States Patent
Kim et al.

(10) Patent No.: US 12,444,984 B2
(45) Date of Patent: Oct. 14, 2025

(54) METHOD FOR CONTROLLING WIRELESS CHARGING MODE AND DEVICE THEREFOR

(71) Applicant: Samsung Electronics Co., Ltd., Suwon-si (KR)

(72) Inventors: Yusu Kim, Suwon-si (KR); Byunghwa Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 18/450,759

(22) Filed: Aug. 16, 2023

(65) Prior Publication Data

US 2023/0402878 A1   Dec. 14, 2023

Related U.S. Application Data

(63) Continuation of application No. PCT/KR2022/005514, filed on Apr. 18, 2022.

(30) Foreign Application Priority Data

Apr. 30, 2021 (KR) .................. 10-2021-0056751

(51) Int. Cl.
 *G06F 1/26* (2006.01)
 *H02J 50/12* (2016.01)
 (Continued)

(52) U.S. Cl.
 CPC .............. *H02J 50/12* (2016.02); *G06F 1/266* (2013.01); *H02J 50/20* (2016.02); *H02J 50/40* (2016.02)

(58) Field of Classification Search
 CPC ...................................................... G06F 1/266
 See application file for complete search history.

(56) References Cited

U.S. PATENT DOCUMENTS 9,577,460 B2 * 2/2017 Park .................... H02J 7/00034
10,014,725 B2   7/2018 Jung et al.
(Continued)

FOREIGN PATENT DOCUMENTS

CN      101860087 B    8/2012
KR   10-2008-0098320 A  11/2008
(Continued)

OTHER PUBLICATIONS

European Search Report dated Nov. 8, 2024, issued in European Application No. 22796022.6.
(Continued)

*Primary Examiner* — Jaweed A Abbaszadeh
*Assistant Examiner* — Ayman Fatima
(74) *Attorney, Agent, or Firm* — Jefferson IP Law, LLP

(57) ABSTRACT

An electronic device is provided. The electronic device includes a wireless charging circuit and a processor operatively connected to the wireless charging circuit, wherein the processor is configured to wireless receive power wireless from an external device through the wireless charging circuit on the basis of a first wireless charging mode using a first frequency, detect a second frequency rather than the first frequency through the wireless charging circuit, and determine, in response to detecting the second frequency, whether to change the charging mode from the first wireless charging mode to a second wireless charging mode, based on at least one of a wireless charging efficiency or an output voltage of the electronic device.

20 Claims, 11 Drawing Sheets

(51) Int. Cl.
*H02J 50/20* (2016.01)
*H02J 50/40* (2016.01)

(56) References Cited

U.S. PATENT DOCUMENTS

| | | | |
|---|---|---|---|
| 10,693,328 B2 | 6/2020 | Hwang et al. | |
| 10,749,367 B2 | 8/2020 | Kim et al. | |
| 11,489,371 B2* | 11/2022 | Woo | H04B 5/79 |
| 2013/0002035 A1 | 1/2013 | Oodachi et al. | |
| 2013/0049484 A1 | 2/2013 | Weissentern et al. | |
| 2015/0115878 A1 | 4/2015 | Park | |
| 2015/0318710 A1 | 11/2015 | Lee et al. | |
| 2017/0133889 A1* | 5/2017 | Yeo | H02J 50/12 |
| 2018/0109148 A1 | 4/2018 | Meng et al. | |
| 2018/0138749 A1* | 5/2018 | Lee | H02J 50/12 |
| 2019/0039466 A1* | 2/2019 | Jung | B60L 53/12 |
| 2020/0381941 A1* | 12/2020 | Kim | H02J 7/00036 |
| 2022/0029461 A1 | 1/2022 | Wan | |

FOREIGN PATENT DOCUMENTS

| | | |
|---|---|---|
| KR | 10-2009-0086050 A | 8/2009 |
| KR | 10-2011-0055903 A | 5/2011 |
| KR | 10-2015-0050027 A | 5/2015 |
| KR | 10-2016-0119530 A | 10/2016 |
| KR | 10-2016-0133140 A | 11/2016 |
| KR | 10-2017-0054976 A | 5/2017 |
| KR | 10-2018-0121135 A | 11/2018 |
| KR | 10-2018-0124274 A | 11/2018 |
| KR | 10-2019-0015994 A | 2/2019 |
| KR | 10-2020-0083105 A | 7/2020 |
| KR | 10-2271968 B1 | 7/2021 |
| WO | 2020/220174 A1 | 11/2020 |

OTHER PUBLICATIONS

International Search Report dated Aug. 2, 2022, issued in International Application No. PCT/KR2022/005514.
Korean Office Action dated May 19, 2025, issued in Korean Patent Application No. 10-2021-0056751.

* cited by examiner

METHOD FOR CONTROLLING WIRELESS CHARGING MODE AND DEVICE THEREFOR

CROSS-REFERENCE TO RELATED APPLICATION(S)

This application is a continuation application, claiming priority under § 365(c), of an International application No. PCT/KR2022/005514, filed on Apr. 18, 2022, which is based on and claims the benefit of a Korean patent application number filed on Apr. 30, 2021, in the Korean Intellectual Property Office, the disclosure of which is incorporated by reference herein in its entirety.

BACKGROUND

1. Field

The disclosure relates to a method for controlling a wireless charging mode and a device therefor.

2. Description of Related Art

A wireless charging mode includes a magnetic induction mode, a magnetic resonance mode, or a radio frequency (RF) mode, and electronic devices performing wireless charging by using the wireless charging mode are increasing.

The magnetic induction mode is a wireless charging mode that wirelessly delivers power through an induced current that is provided using a magnetic field provided between a coil included in an electronic device and a coil included in a wireless charger. In the magnetic induction mode, when a distance between the coil included in the electronic device and the coil included in the wireless charger exceeds several mm, charging can be cut off while coupling between the coils is rapidly weakened, but, because the charging is performed in a tightly coupling mode, a charging efficiency can be better than that of the magnetic resonance mode. The tightly coupling mode can mean that the electronic device performs wireless charging in a state where the distance between the coils is short.

The magnetic resonance mode is a wireless charging mode that wirelessly delivers power by using a magnetic resonance phenomenon provided between a coil included in an electronic device and a coil included in a wireless charger. Since the magnetic resonance mode performs charging in a loosely coupling mode between the coil included in the electronic device and the coil included between the wireless charger, a charging efficiency can be less than that of the magnetic induction mode, but wireless charging can be possible even if a distance between the coils is several tens of cm. The loosely coupling mode can mean that the electronic device performs wireless charging in a state where the distance between the coils is far apart.

The above information is presented as background information only to assist with an understanding of the disclosure. No determination has been made, and no assertion is made, as to whether any of the above might be applicable as prior art with regard to the disclosure.

SUMMARY

In an electronic device and a wireless charger that support all wireless charging modes of a magnetic induction mode and a magnetic resonance mode, the electronic device needs to, when starting wireless charging, determine the wireless charging mode and perform the wireless charging.

The wireless charging mode is determined as either the magnetic induction mode or the magnetic resonance mode in an initial stage of performing wireless charging, and the electronic device can perform the wireless charging in the corresponding mode until the wireless charging is terminated. For example, when trying to perform the wireless charging by using the wireless charger supporting all of the magnetic induction mode and the magnetic resonance mode, even though a user intends to perform the wireless charging through the magnetic induction mode while placing the electronic device on a pad of the wireless charger, the wireless charging mode can be determined as the magnetic resonance mode while the electronic device enters a space where a beacon of the wireless charger exists, and the wireless charging can be performed in the magnetic resonance mode until the wireless charging is terminated. In this case, it can be necessary to change the wireless charging mode from the magnetic resonance mode to the magnetic induction mode during the wireless charging in order to increase the efficiency of wireless charging.

Also, when there is a change of a wireless charging efficiency due to a distance between an electronic device and a wireless charger or a misalignment between coils while wireless charging is being performed in a specific mode, it can be necessary to change a wireless charging mode in order to increase the wireless charging efficiency.

Aspects of the disclosure are to address at least the above-mentioned problems and/or disadvantages and to provide at least the advantages described below. Accordingly, an aspect of the disclosure is to provide a device and method, etc. capable of selecting wireless charging modes of a magnetic induction mode and a magnetic resonance mode, based on a charging environment.

Additional aspects will be set forth in part in the description which follows and, in part, will be apparent from the description, or may be learned by practice of the presented embodiments.

In accordance with an aspect of the disclosure, an electronic device is provided. The electronic device includes a wireless charging circuit, and a processor operatively connected to the wireless charging circuit. The processor is configured to wirelessly receive power from an external device through the wireless charging circuit, based on a first wireless charging mode using a first frequency, detect a second frequency rather than the first frequency through the wireless charging circuit, and, in response to detecting the second frequency, determine whether to change the first wireless charging mode to a second wireless charging mode, based on at least one of a wireless charging efficiency or an output voltage of the electronic device.

In accordance with another aspect of the disclosure, an electronic device is provided. The electronic device includes a wireless charging circuit, and a processor operatively connected to the wireless charging circuit. The processor is configured to wirelessly receive power from an external device through the wireless charging circuit, identify a band of a frequency corresponding to the received power, determine a wireless charging mode, based on the identified band of the frequency, and wirelessly receive power from the external device through the wireless charging circuit by using the frequency, based on the determined wireless charging mode and charge a battery of the electronic device.

According to various embodiments disclosed in the document, an electronic device supporting all wireless charging modes of a magnetic induction mode and a magnetic resonance mode may select a specific mode and perform wireless charging.

According to various embodiments disclosed in the document, when a charging efficiency is decreased while wireless charging is performed in one of a magnetic induction mode and a magnetic resonance mode, an electronic device may change to a charging mode having a high charging efficiency and perform wireless charging.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
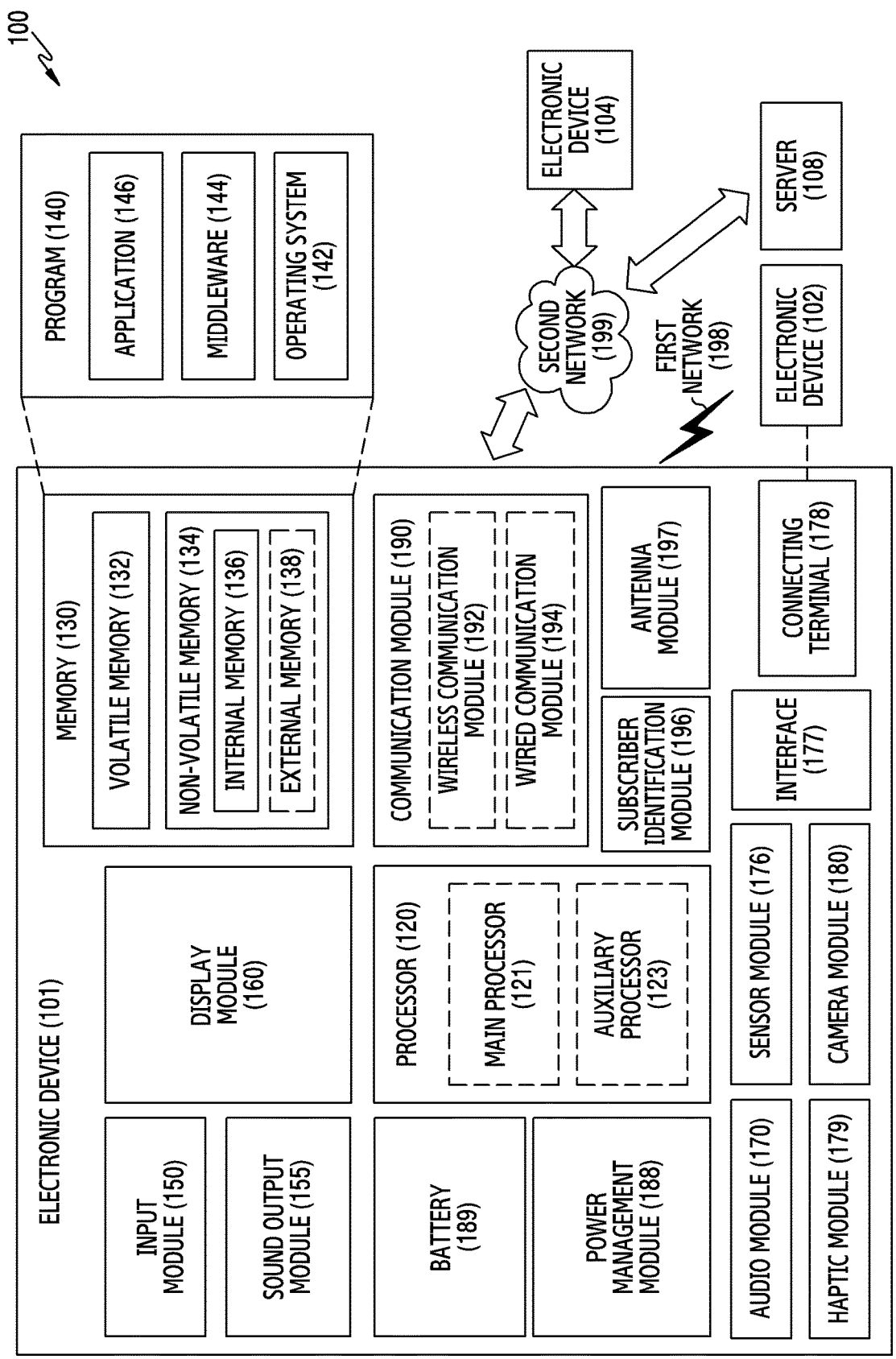
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
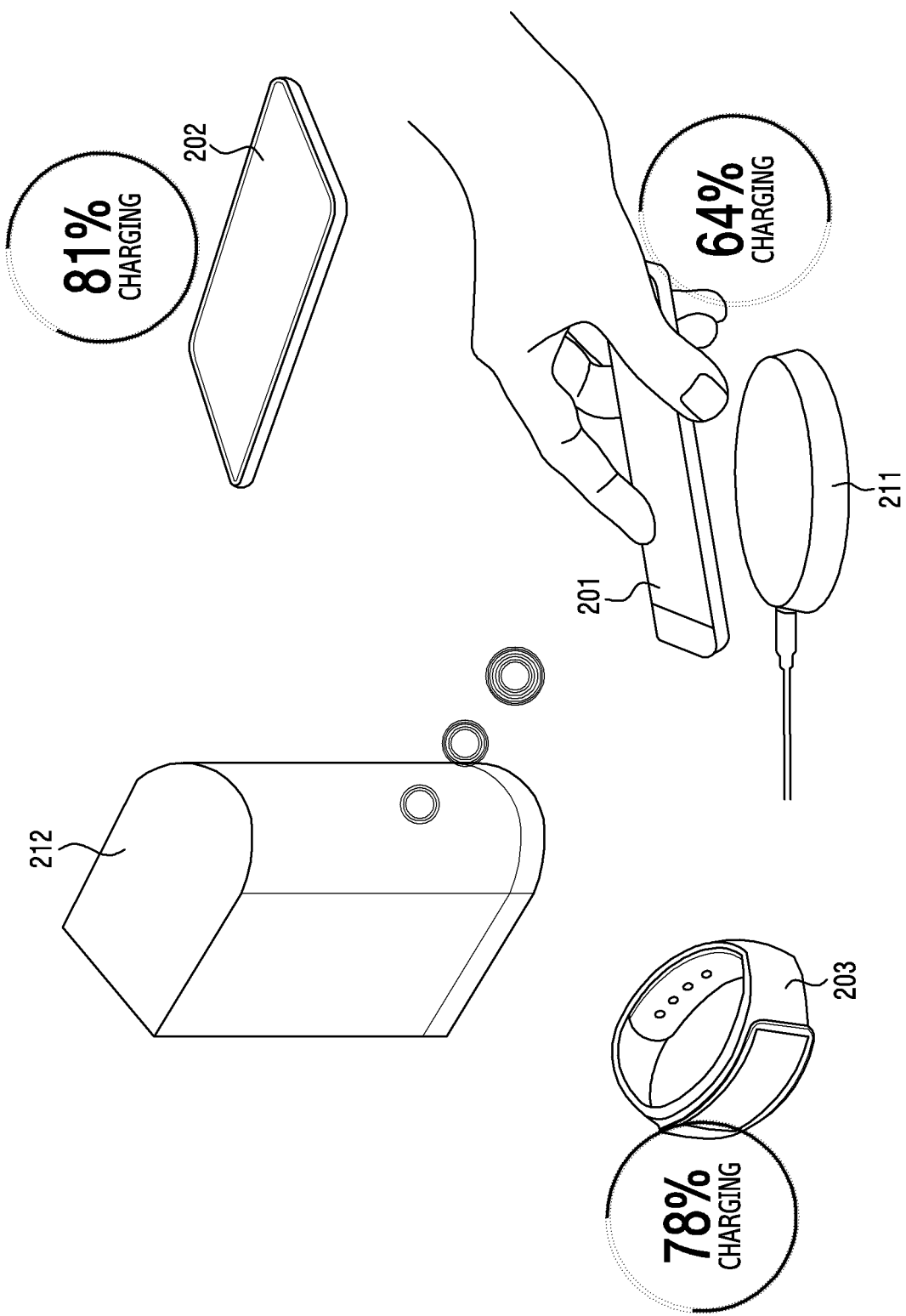
FIG. 2 illustrates an electronic device and an external device according to an embodiment of the disclosure.

FIG. 2 illustrates electronic devices 201, 202, and 203 and external devices 211 and 212 according to an embodiment of the disclosure.

Referring to FIG. 2, an electronic device (e.g., the first electronic device 201, the second electronic device 202, and the third electronic device 203) may be an electronic device that supports wireless charging modes of a magnetic induction mode and/or a magnetic resonance mode. For example, the first electronic device 201 may mean a smart phone, the second electronic device 202 may mean a tablet personal computer (PC), and the third electronic device 203 may mean a smart watch 203. However, the electronic device is not limited to the above-described example and may include an electronic device that supports the wireless charging modes of the magnetic induction mode and/or the magnetic resonance mode. In the document, a description is made centered on the first electronic device 201 (hereinafter, the electronic device 201) corresponding to a smart phone, and the described content may be identically applied to the second electronic device 202 and the third electronic device 203.

According to one embodiment, the external devices (e.g., the first external device 211 and the second external device 212) may be electronic devices that support wireless charging modes of a magnetic induction mode and/or a magnetic resonance mode. For example, the first external device 211 may mean a pad-type wireless charger that supports the wireless charging modes of the magnetic induction mode and/or the magnetic resonance mode, and the second external device 212 may mean a cylindrical or space-type wireless charger that supports the wireless charging modes of the magnetic induction mode and/or the magnetic resonance mode. In the document, a description is made centered on the first external device 211 (hereinafter, the external device 211) corresponding to the pad-type wireless charger supporting the wireless charging modes of the magnetic induction mode and the magnetic resonance mode, and the described content may be equally applied to the second external device 212.

According to one embodiment, a wireless power transfer (WPT) technology, which is a technology for converting electrical energy into electromagnetic waves and wirelessly delivering energy to a load without a transmission line, may include wireless charging modes of a magnetic induction mode and a resonance mode.

According to one embodiment, the wireless charging mode of the magnetic induction mode is a mode of delivering power by using a magnetic field induced in a coil, and may refer to a mode of supplying energy to a load, by allowing an induced current to flow in a receiving coil by using a magnetic field provided from a current flowing in a transmitting coil. The standard of the magnetic induction mode includes wireless power consortium (WPC) and power matters alliance (PMA). For example, a power transfer frequency of WPC may be 110 to 205 kHz, and a power transfer frequency of PMA may be 227 to 357 kHz and 118 to 153 kHz.

According to one embodiment, when wireless charging of the magnetic induction mode is performed, when a distance between coils exceeds several mm, the wireless charging may be cut off while coupling is rapidly weakened. Since the magnetic induction mode is a tightly coupling mode, a charging efficiency may be higher than that of the magnetic resonance mode.

According to one embodiment, the wireless charging mode of the magnetic resonance mode may refer to a mode of supplying energy by using a magnetic resonance phenomenon between coils. The standard of the magnetic resonance mode include alliance for wireless power (A4WP) and air fuel alliance (AFA), and for example, a power transfer frequency of the resonance mode may be 6.78 MHz.

According to one embodiment, when wireless charging of the magnetic resonance mode is performed, since the magnetic resonance mode is a loosely coupling mode, the wireless charging may be performed up to a distance of tens of cm between coils.

According to one embodiment, the electronic device 201 may contact on a pad of the external device 211, and perform wireless charging by using the magnetic induction mode.

According to one embodiment, the electronic device 201 may perform wireless charging by using the magnetic resonance mode without contacting on the pad of the external device 211. For example, the second electronic device 202 or the third electronic device 203 may perform wireless charging by using the magnetic resonance mode without contacting on a wireless charging pad.

Figure 3:
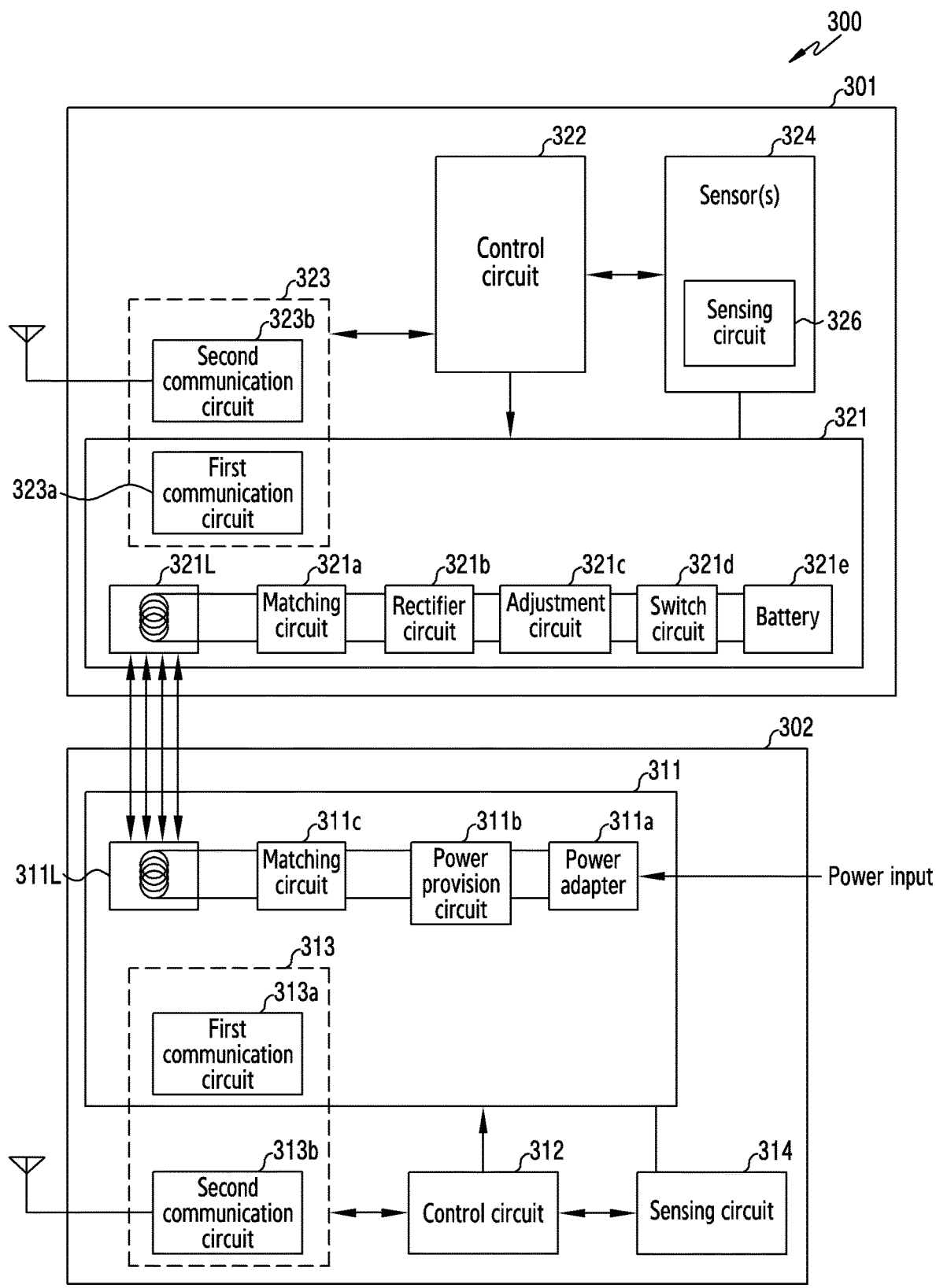
FIG. 3 illustrates a wireless charging system according to an embodiment of the disclosure.

FIG. 3 illustrates a wireless charging system 300 according to one embodiment of the disclosure.

Referring to FIG. 3, an electronic device 301 (e.g., the electronic device 101 of FIG. 1 and/or the electronic devices 201, 202, and 203 of FIG. 2) may wirelessly receive power from an external device 302 (e.g., the electronic device 102 of FIG. 1 and the external devices 211 and 212 of FIG. 2). The electronic device 301 may be a wireless power receiver, or an electronic device operating in a power reception mode. For example, the electronic device 301 may include a smart phone, a smart watch, or a tablet PC.

According to one embodiment, the electronic device 301 may include not only a wireless power receiver or an electronic device operating in a power reception mode, but also a wireless power transmitter or an electronic device operating in a power transmission mode. For example, when the electronic device 301 corresponds to the wireless power transmitter or the electronic device operating in the power transmission mode, components of the electronic device 102 of FIG. 1, the external devices 211 and 212 of FIG. 2, and the external device 401 of FIG. 4 may be applied to components of the electronic device 301.

According to one embodiment, the external device 302 may wirelessly supply power to the electronic device 301. The external device 302 may be a wireless power transmitter or an electronic device operating in a power transmission mode. For example, the external device 302 may include a pad-type wireless charger or a cylindrical or spherical space wireless charger.

According to one embodiment, the electronic device 301 may include the same or similar construction as the electronic device 101 shown in FIG. 1. The external device 302 may include the same or similar construction as the electronic device 102 shown in FIG. 1.

According to one embodiment, the electronic device 301 may be a power receiving device that receives power from the external device 302, and the external device 302 may be a power transmitting device that transmits power to the electronic device 301.

According to one embodiment, the external device 302 may include a power transfer circuit 311, a control circuit 312, a communication circuit 313, or a sensing circuit 314.

According to one embodiment, the power transfer circuit 311 may include a power adapter 311a for receiving a power source (or power) from the outside and appropriately converting a voltage of the input power source, a power provision circuit 311b for providing power, or a matching circuit 311c for maximizing efficiency between a transmitting coil 311L and a receiving coil 321L.

According to one embodiment, the power transfer circuit 311 may communicate with a first communication circuit 323a of the electronic device 301 by using a frequency identical to or adjacent to a frequency used by the transmitting coil 311L for power delivery. The power transfer circuit 311 may perform an operation corresponding to an operation of a first communication circuit 313a to be described later.

According to one embodiment, the power transfer circuit 311 may include the first communication circuit 313a, which will be described later, and communicate with the first communication circuit 323a of the external device 301 through the first communication circuit 313a.

According to one embodiment, the external device 302 may include a separate communication circuit in order to communicate with the electronic device 301 by using any one of various short-range communication methods such as Bluetooth, Bluetooth low energy (BLE), Wi-Fi, and near field communication (NFC). The separate communication circuit may correspond to, for example, a second communication circuit 313b to be described later.

According to one embodiment, the power transfer circuit 311 may configure in plurality at least some of the power adapter 311a, the power provision circuit 311b, the transmitting coil 311L, or the matching circuit 311c wherein power transmission is possible to a plurality of power receiving devices (e.g., the electronic devices 201, 202, and 203 of FIG. 2).

According to one embodiment, the control circuit 312 may perform overall control of the external device 302, and provide various messages required for wireless power transmission and deliver them to the communication circuit 313.

According to one embodiment, the control circuit 312 may calculate power (or power value) to be transmitted to the electronic device 301, based on information received from the communication circuit 313.

According to one embodiment, the control circuit 312 may control the power transfer circuit 311 wherein power provided by the transmitting coil 311L is transmitted to the electronic device 301.

According to one embodiment, the communication circuit 313 may include at least one of a first communication circuit 313*a* and a second communication circuit 313*b*. For example, the first communication circuit 313*a* may communicate with the first communication circuit 323*a* of the electronic device 301 by using a frequency identical to or adjacent to a frequency used by the transmitting coil 311L for power delivery. The external device 302 may perform data communication with the electronic device 301 through a magnetic field signal formed using a coil. For another example, the external device 302 may perform data communication with the electronic device 301 by using a separate antenna rather than a coil to which a wireless power signal is applied through the second communication (e.g., out-band communication).

According to one embodiment, the first communication circuit 313*a* may communicate with the first communication circuit 323*a*, by using the transmitting coil 311L. Data (or communication signal) provided by the first communication circuit 313*a* may be transmitted using the transmitting coil 311L. The first communication circuit 313*a* may deliver data to the electronic device 301 by using a frequency shift keying (FSK) modulation technique.

According to one embodiment, the first communication circuit 313*a* may communicate with the first communication circuit 323*a* of the electronic device 301 by changing a frequency of a power signal delivered through the transmitting coil 311L. The first communication circuit 313*a* may communicate with the first communication circuit 323*a* of the electronic device 301 by allowing data to be included in a power signal provided by the power provision circuit 311*b*. For example, the first communication circuit 313*a* may express data by increasing or decreasing a frequency of a power transfer signal. For example, the first communication circuit 313*a* may express data by using 110 kHz and 110.68 kHz as the frequency of the power transfer signal.

According to one embodiment, the second communication circuit 313*b* may communicate with the second communication circuit 323*b* of the electronic device 301 by using a frequency different from a frequency used by the transmitting coil 311L for power delivery (e.g., out-band communication). For example, the second communication circuit 313*b* may acquire information related to a state of charge (e.g., a voltage value after a rectifier, a rectified voltage value (e.g., Vrect), information, current information (e.g., Iout) flowing in a coil or rectifier circuit, various packets, or messages) from the second communication circuit 323*b* by using any one of various short-range communication methods such as Bluetooth, Bluetooth low energy (BLE), Wi-Fi, and near field communication (NFC).

According to one embodiment, the sensing circuit 314 may include at least one or more sensors, and may detect at least one state of the power transfer device 301 by using the one or more sensors.

According to one embodiment, the sensing circuit 314 may include at least one of a temperature sensor, a motion sensor, or a current (or voltage) sensor, and may detect a temperature state of the external device 302 by using the temperature sensor, and may detect a motion state of the external device 302 by using the motion sensor, and may detect a state, for example, a current magnitude, a voltage magnitude or a power magnitude, of an output signal of the external device 302 by using the current (or voltage) sensor.

According to one embodiment, the current (or voltage) sensor may measure a signal from the power transfer circuit 311. The current (or voltage) sensor may measure a signal in at least a partial region of the matching circuit 311*c* or the power provision circuit 311*b*. For example, the current (or voltage) sensor may include a circuit for measuring a signal at a front end of the coil 311L.

According to one embodiment, the sensing circuit 314 may be a circuit for foreign object detection (FOD). The external device 302 may measure a current and voltage in the power transfer circuit 311 through the sensing circuit 314, and acquire a magnitude of power transmitted by the external device 302, based on the measured current and voltage. When an external object exists between the external device 302 and the electronic device 301, a magnitude of loss power, which is a difference between power transmitted by the external device 302 and power received by the electronic device 301, may increase. The external device 302 may stop power transmission when the loss power exceeds a specified threshold.

According to one embodiment, the sensing circuit 314 may measure a current and voltage applied to the power transfer circuit 311 (e.g., the power provision circuit 311*b* or the transmitting coil 311L) by the change of the electronic device 301, and detect the change of the electronic device 301.

According to one embodiment, the electronic device 301 (e.g., the electronic device 101 of FIG. 1) may include a power receiving circuit 321, a control circuit 322, a communication circuit 323, at least one sensor 324, or a sensing circuit 326. A description of the construction of the electronic device 301 corresponding to the external device 302 may be partially omitted.

According to one embodiment, the electronic device 301 may correspond to a wireless power transmitter or an electronic device operating in a power transmission mode. When the electronic device 301 corresponds to the wireless power transmitter or the electronic device operating in the power transmission mode, the electronic device 301 may include components of the external device 302 required for power transmission.

According to one embodiment, the power receiving circuit 321 may include a receiving coil 321L for wirelessly receiving power from the external device 302, a matching circuit 321*a*, a rectifier circuit 321*b* for rectifying a received alternating current (AC) power to direct current (DC), an adjustment circuit 321*c* for adjusting a charging voltage, a switch circuit 321*d*, or a battery 321*e*.

According to one embodiment, the control circuit 322 may perform overall control of the electronic device 301, and provide various messages required for wireless power transmission and deliver them to the communication circuit 323.

According to one embodiment, the communication circuit 323 may include at least one of the first communication circuit 323*a* and the second communication circuit 323*b*. The first communication circuit 323*a* may communicate with the external device 302 through the receiving coil 321L.

According to one embodiment, the first communication circuit 323*a* may communicate with the first communication circuit 313*a* by using the receiving coil 321L. Data (or communication signals) provided by the first communication circuit 323*a* may be transmitted using the receiving coil 321L. The first communication circuit 323*a* may deliver data to the external device 302 by using an amplitude shift keying (ASK) modulation technique. The second communication circuit 323*b* may communicate with the external device 302 by using any one of various short-range communication methods such as Bluetooth, BLE, Wi-Fi, and NFC.

According to one embodiment, the at least one sensor 324 may include at least some of a current/voltage sensor, a temperature sensor, an illuminance sensor, or an acceleration sensor. The at least one sensor 324 may detect a state of the power receiving circuit 321. For example, the electronic device 301 may measure a current and voltage in the power receiving circuit 321 through the at least one sensor 324, and acquire a magnitude of power received by the electronic device 301, based on the measured current and voltage. According to one embodiment, the at least one sensor 324 may identify (or check) a frequency band in which power is wirelessly received from the external device 302.

According to one embodiment, the sensing circuit 326 may detect the external device 302 by detecting a search signal or a received power from the external device 302. The sensing circuit 326 may detect the change of a signal of an input/output terminal of the coil 321L, the matching circuit 321a, or the rectifier circuit 321b, by a coil 321L signal provided by a signal outputted from the external device 302.

According to one embodiment, the sensing circuit 326 may be included in the receiving circuit 321.

Figure 4:
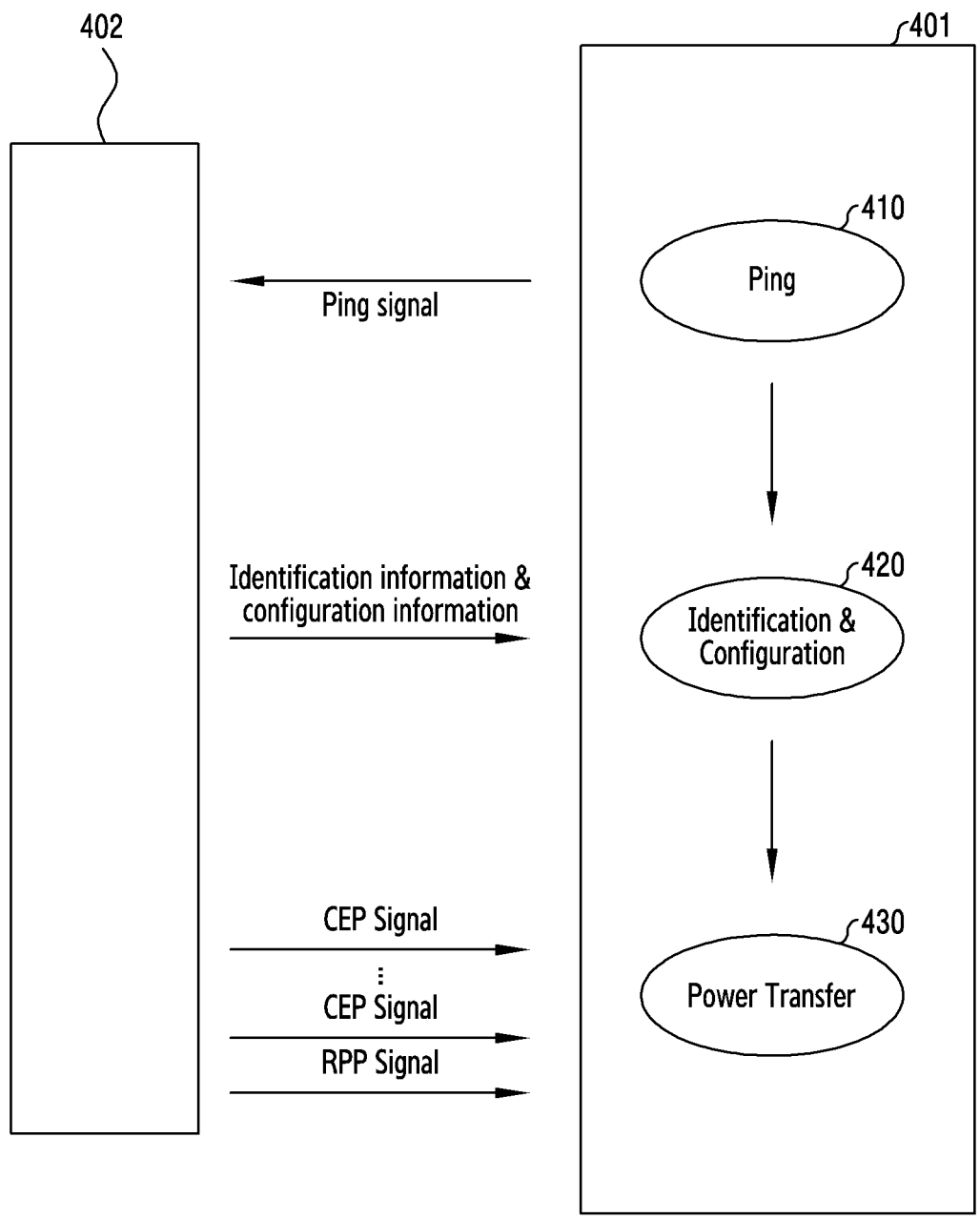
FIG. 4 illustrates an operation mode of an external device during wireless charging according to an embodiment of the disclosure.

FIG. 4 illustrates an operation mode of an external device 401 during wireless charging according to an embodiment of the disclosure.

Referring to FIG. 4, an external device 401 (e.g., the electronic device 102 of FIG. 1 or the external devices 211 and 212 of FIG. 2) may detect and authenticate an electronic device 402 (e.g., the electronic device 101 of FIG. 1 or the electronic devices 201, 202, and 203 of FIG. 2), and may transmit/receive and output at least one signal corresponding to a ping phase 410, an authentication phase (identification & configuration) 420 and/or a power transfer phase 430 in order to present power to the electronic device 402.

According to one embodiment, the external device 401 may transmit a ping signal (e.g., digital ping signal or analog ping signal) in the ping phase 410. The external device 401 may detect the electronic device 402 as the electronic device 402 receives the ping signal from the external device 401.

According to one embodiment, the external device 401 may receive identification information and configuration information for authenticating a power receiving device from the electronic device 402 in the authentication phase (identification & configuration) 420 as the electronic device 402 is detected. The identification information may include information for identifying the electronic device 402, and the configuration information may include various types of information required for the electronic device 402 to receive power.

According to one embodiment, the external device 401 may authenticate the electronic device 402, based on the identification information and configuration information from the electronic device 402, and as the authentication succeeds, the external device 401 may receive power information from the electronic device 402 in the power transfer phase 430.

According to one embodiment, while the electronic device 402 performs wireless charging from the external device 401, the electronic device 402 may transmit a signal corresponding to power information to the external device 401. For example, the signal corresponding to the power information may include a control error packet (CEP) signal and a received power packet (RPP) signal. According to one embodiment, while the electronic device 402 performs wireless charging from the external device 401, the external device 402 may receive data (e.g., control error packet (CEP) or received power packet (RPP) signal) corresponding to at least one or more pieces of power information. For example, the control error packet (CEP) signal may include information indicating a magnitude of transmission power transmitted by the external device 401 or a request for change of transmission power, and the received power packet (RPP) signal may include information indicating a magnitude of received power received by the electronic device 402.

Figure 5:
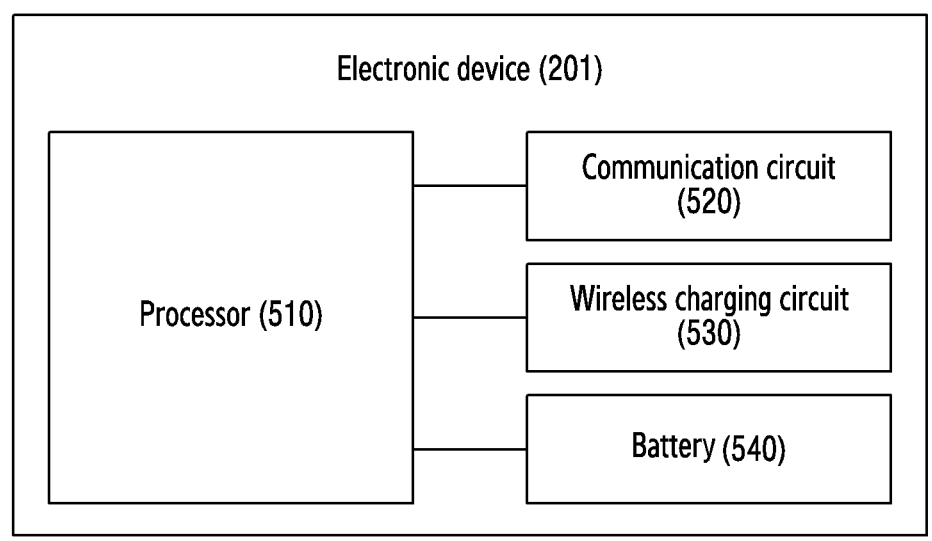
FIG. 5 illustrates a block diagram of an electronic device according to an embodiment of the disclosure.

FIG. 5 illustrates a block diagram of an electronic device 201 according to an embodiment of the disclosure.

Referring to FIG. 5, the electronic device 201 may include a processor 510 (e.g., the control circuit 322), a communication circuit 520 (e.g., the communication circuit 323), and a wireless charging circuit 530 (e.g., the power receiving circuit 321). Components included in the electronic device 201 may not be limited to the components (e.g., the processor 510, the communication circuit 520, and the wireless charging circuit 530) illustrated in the block diagram of FIG. 5. The components of the electronic device 201 illustrated in FIG. 5 may be replaced with other components, or additional components may be included in the electronic device 201. For example, the components of the electronic device 301 illustrated in FIG. 3 may be applied to the components of the electronic device 201 illustrated in FIG. 5. For another example, at least some of the components of the electronic device 101 of FIG. 1 may be included in the components of the electronic device 201 of FIG. 5. The electronic device 201 may correspond to the electronic device 102 of FIG. 1, the electronic device 301 of FIG. 3, and the electronic device 402 of FIG. 4.

According to one embodiment, the processor 510 may control operations of the components (e.g., the communication circuit 520 and the wireless charging circuit 530) of the electronic device 201 by executing instructions stored in a memory. The processor 510 may be operatively and/or electrically connected with the communication circuit 520 and the wireless charging circuit 530. The processor 510 may execute software to control at least one other component (e.g., the communication circuit 520 and the wireless charging circuit 530) connected to the processor 510. The processor 510 may acquire commands from the components included in the electronic device 201, and may interpret the acquired commands, and process and/or compute various data according to the interpreted commands.

According to one embodiment, the communication circuit 520 may support communication execution of the electronic device 201 (e.g., smart phone) by using wired communication or wireless communication (e.g., Bluetooth (BT), Bluetooth low energy (BLE), Wi-Fi, NFC). For example, the electronic device 201 may perform communication with an external device (e.g., the external device 211) by using a frequency identical to or adjacent to a frequency used for wireless power transfer, through the communication circuit 520.

According to one embodiment, the wireless charging circuit 530 may perform wireless charging by using a magnetic field provided through a coil. For example, the electronic device 201 may perform wireless charging of a magnetic induction mode or magnetic resonance mode through the wireless charging circuit 530.

Figure 6A:
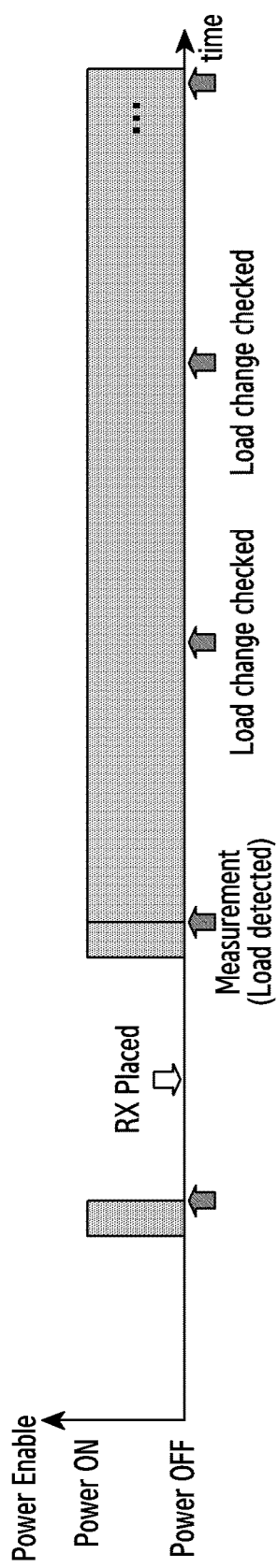
FIGS. 6A and 6B illustrate a communication flow of a magnetic resonance mode according to various embodiments of the disclosure.
Figure 6B:
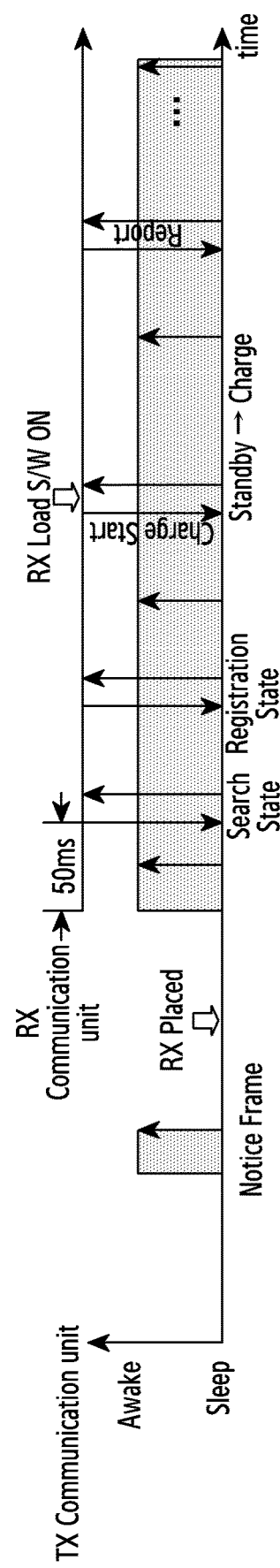

FIGS. 6A and 6B illustrate a communication flow of a magnetic resonance mode according to various embodiments of the disclosure.

FIG. 6A illustrates the change of a power source state of the external device 211 (e.g., wireless charger) dependent on a flow of time when the electronic device 201 (e.g., smart phone) is placed on a pad of the external device 211 (e.g., wireless charger). When a power source of the external device 211 is in an ON state, the external device 211 may periodically transmit a beacon signal. When the power source of the external device 211 is in an OFF state, the external device 211 may not transmit the beacon signal. For example, when the power source of the external device 211 is in an OFF state, the external device 211 may deactivate at least some of the components of the external device 211.

According to one embodiment, the external device 211 may maintain the ON state of the power source of the external device 211 for a specified time (e.g., about 15 ms to 20 ms) in order to detect a load. The external device 211 may detect the load and/or a load change while the power source is in the ON state. The external device 211 may alternately change the power source of the external device 211 to the ON state and the OFF state in order to detect the load. For example, the external device 211 may maintain the power source in the ON state for about 15 ms to 20 ms, switch the power source to the OFF state for about 250 ms, and switch the power source of the OFF state back to the ON state.

According to one embodiment, while the power source of the external device 211 is in the ON state, the external device 211 may measure a current (Idd) of the external device 211 in order to detect a load. The external device 211 may switch the power source of the external device 211 to the OFF state, based on a value of the measured current. For example, when the value of the measured current is less than or equal to a predetermined value, the external device 211 may switch the power source of the external device 211 to the OFF state.

According to one embodiment, while the power source of the external device 211 is in the ON state, the external device 211 may measure a current (Idd) of the external device 211 in order to detect a load. The external device 211 may maintain the power source of the external device 211 in the ON state, based on a value of the measured current. For example, when the value of the measured current is greater than or equal to a predetermined value, the external device 211 may control the power source of the external device 211 to be in the ON state. For another example, when a difference between the value of the measured current and a value of a current measured while the electronic device 201 is not placed on the external device 211 is greater than or equal to the predetermined value, the external device 211 may maintain the power source of the external device 211 in the ON state. For further example, when a difference between a value of a currently measured current and a value of a current measured one or more cycles ago is greater than or equal to the predetermined value, the external device 211 may maintain the power source of the external device 211 in the ON state.

According to one embodiment, when a predetermined time elapses from when the electronic device 201 is placed on the external device 211, the external device 211 may start measuring a load. For example, the external device 211 may periodically measure a load in order to detect that the electronic device 201 is placed on the external device 211. For another example, when the external device 211 detects that an external object (e.g., the electronic device 201) is placed through the sensing circuit 314, the load measurement may be initiated. The external device 211 may check a load change every constant cycle from the start of the load measurement. The external device 211 may identify that the electronic device 201 is placed on the external device 211 when the load change is greater than or equal to a reference value.

Referring to FIG. 6B, a TX communication unit may refer to a communication circuit of the external device 211, and an RX communication unit may refer to the communication circuit 520 of the electronic device 201. When the electronic device 201 is placed on a pad of the external device 211, the change of a state (e.g., awake state or sleep state) of the external device 211 dependent on a flow of time is illustrated.

According to one embodiment, the communication circuit of the external device 211 may periodically transmit a notice frame.

According to one embodiment, when a predetermined time elapses from when the electronic device 201 is placed on the external device 211, the external device 211 may enter an awake state. While the electronic device 201 is placed on the external device 211, when a predetermined time (e.g., about 20 ms to 50 ms) has elapsed from when the external device 211 entered the awake state, the electronic device 201 and the external device 211 may be in a search state. While the electronic device 201 and the external device 211 are in the search state, the electronic device 201 may transmit a search frame to each channel when a predetermined time (e.g., about 20 ms to 50 ms) has elapsed from when the external device 211 entered the awake state.

According to an embodiment, the search frame may include set power information of a mobile terminal. The power information is information that is presented from the mobile terminal (e.g., the electronic device 201) when the mobile terminal (e.g., the electronic device 201) enters a power supply possible area of the wireless charger (e.g., the external device 211), and the power information may include voltage, current information induced by an antenna (e.g., the communication circuit 520) of the mobile terminal (e.g., the electronic device 201), a voltage obtained by rectifying power induced by a coil (e.g., the wireless charging circuit 530), or information about a frequency received by the mobile terminal.

The external device 211 having received the search frame may transmit a response search frame to the electronic device 201. When the electronic device 201 receives the response search frame from the external device 211, the electronic device 201 may check a received signal strength indicator (RSSI) value. The RSSI value may mean the strength of a received signal.

According to one embodiment, the electronic device 201 and the external device 211 may enter a registration state in a search state. When the electronic device 201 and the external device 211 are in the registration state, the electronic device 201 may transmit a request join frame to the external device 211 that has transmitted an RRSI value. According to one embodiment, when the electronic device 201 receives the response search frame, the electronic device 201 may transmit the request join frame in order to request a join for wireless charging to the external device 211, based on the RSSI value. According to one embodiment, the electronic device 201 may transmit a request join frame in order to request a join for wireless charging to the external device 211 that has transmitted a maximum RSSI value. The external device 211 having received the request join frame may confirm that the electronic device 201 is valid for wireless charging, and transmit a response join frame. The response join frame may mean a frame for approving the join by granting an ID.

According to one embodiment, the electronic device 201 and the external device 211 may switch from a standby state to a charging state after the registration state. During the standby state, the electronic device 201 may transmit a signal related to wireless charging to the external device 211. For example, during the standby state, the electronic device 201 may transmit a search frame and a request join frame to the external device 211. When the approved electronic device 201 exists in the registration state, the external device 211 may check transmittable power, and when wireless charging is possible, the external device 211 may transmit a charging start command to the electronic device 201. In response to receiving the charging start command, the electronic device 201 may turn ON a load switch. The electronic device 201 may perform wireless charging by wirelessly receiving power from the external device 211. While performing wireless charging, the electronic device 201 and the external device 211 may transmit and receive a report related to wireless charging. For example, while performing wireless charging, the external device 211 may request information related to wireless charging to the electronic device 201.

Figure 7A:
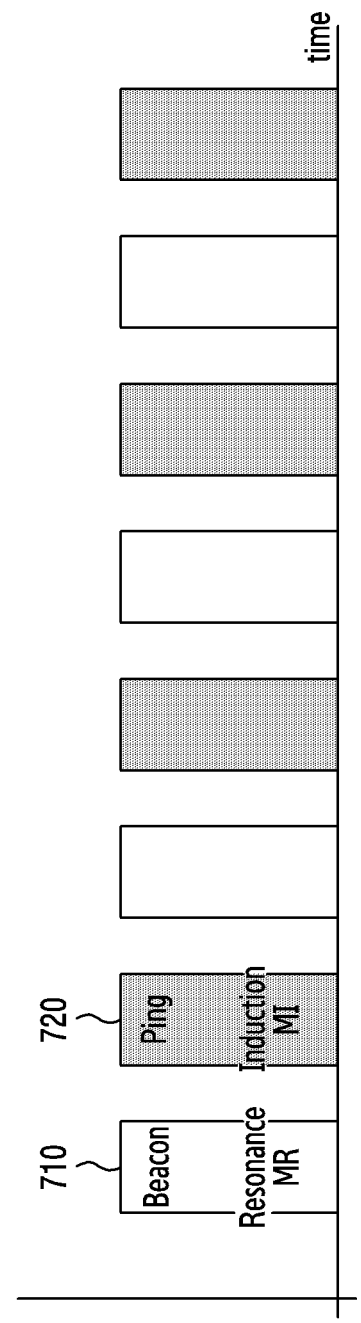
FIG. 7A illustrates a method in which an external device transmits a signal according to an embodiment of the disclosure.

FIG. 7A illustrates a method in which the external device 211 transmits a signal according to an embodiment of the disclosure.

Referring to FIG. 7A, the external device 211 may transmit (or propagate) signals in a time division manner. For example, the external device 211 may transmit a beacon signal 710 and a ping signal 720 in a time division manner during an awake state (e.g., the awake state shown in FIG. 6B). The external device 211 may transmit the beacon signal 710 and the ping signal 720 periodically and alternately. The beacon signal 710 may be a signal related to wireless charging using a magnetic resonance mode, and the ping signal 720 may be a signal related to wireless charging using a magnetic induction mode.

Referring to FIG. 7A, it is illustrated that the external device 211 transmits the beacon signal 710 in the awake state and switches to a sleep state, and again transmits the ping signal 720 in the awake state and switches to the sleep state but, according to one embodiment, the external device 211 may transmit the beacon signal 710 and the ping signal 720 in the awake state and switch to the sleep state.

Although not shown, when the external device 211 transmits the beacon signal 710 and the ping signal 720 in a time division manner, a transmission period and/or transmission time of the beacon signal 710 and the ping signal 720 may be set differently. For example, the transmission period of the ping signal 720 may be shorter than the transmission period of the beacon signal 710, and the transmission time of the ping signal 720 may be longer than the transmission time of the beacon signal 710.

Figure 7B:
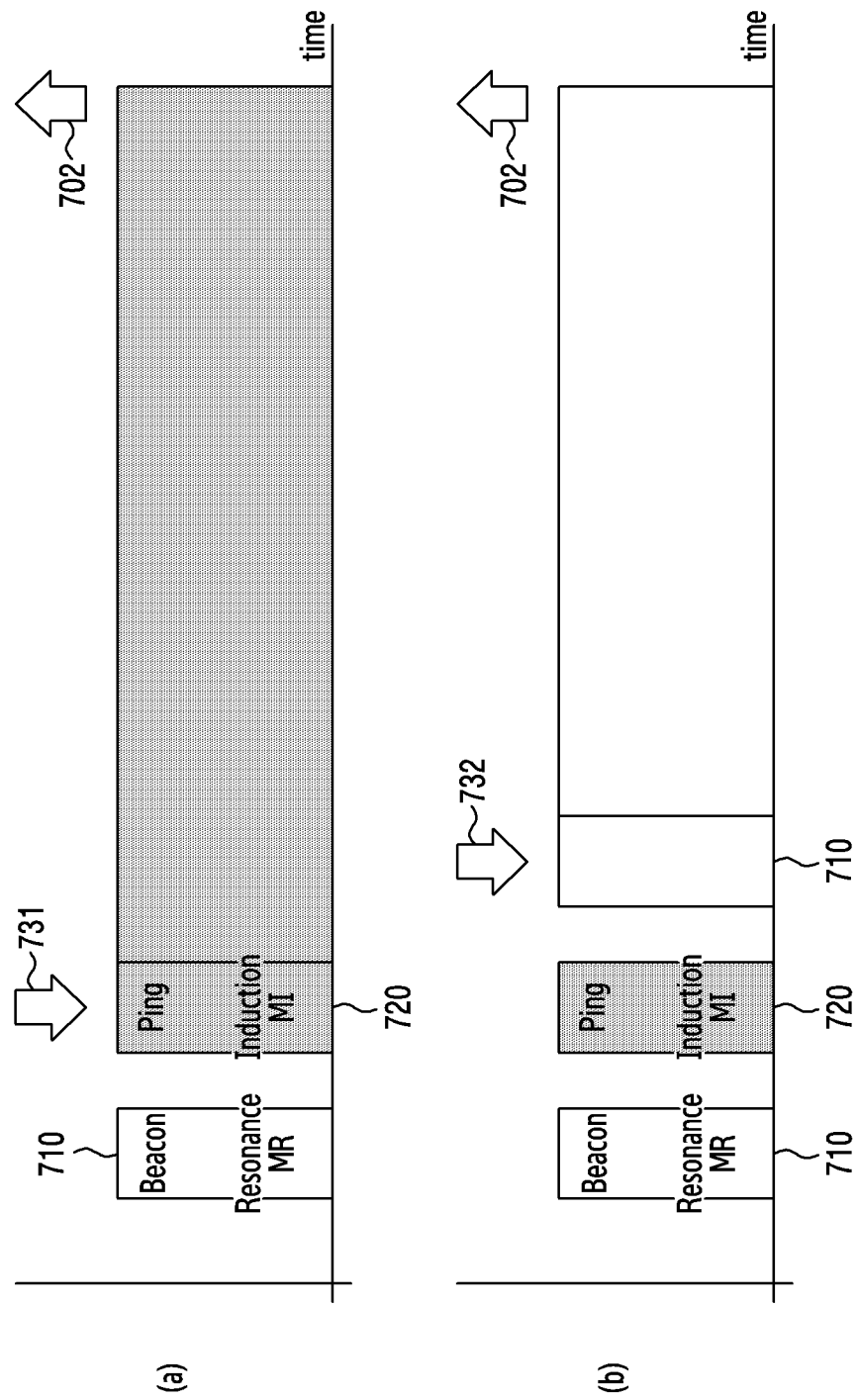
FIG. 7B illustrates a wireless charging mode performed by an electronic device according to an embodiment of the disclosure.

FIG. 7B illustrates a wireless charging mode performed by the electronic device 201 according to an embodiment of the disclosure.

Referring to part (a) of FIG. 7B, the electronic device 201 may perform wireless charging by using a magnetic induction mode. The electronic device 201 may determine a wireless charging mode according to the type of a signal received from the external device 211. For example, when the type of a signal received from the external device 211 is the ping signal 720, the electronic device 201 may determine the wireless charging mode as a magnetic induction mode.

According to one embodiment, the external device 211 may transmit the beacon signal 710 and the ping signal 720 in a time division manner. The electronic device 201 may perform wireless charging by using the magnetic induction mode, from a first time 731 corresponding to when the ping signal 720 transmitted by the external device 211 is received until a second time 702 corresponding to when the reception of the beacon signal 710 or the ping signal 720 is stopped.

Referring to part (b) of FIG. 7B, the electronic device 201 may perform wireless charging by using a magnetic resonance mode. The electronic device 201 may determine a wireless charging mode according to the type of a signal received from the external device 211. For example, when the type of a signal received from the external device 211 is the beacon signal 710, the electronic device 201 may determine the wireless charging mode as the magnetic resonance mode.

According to one embodiment, the external device 211 may transmit the beacon signal 710 and the ping signal 720 in a time division manner. The electronic device 201 may perform wireless charging by using the magnetic resonance mode, from a third time 732 corresponding to when the beacon signal 710 transmitted by the external device 211 is received until a fourth time 704 corresponding to when the reception of the beacon signal 710 or the ping signal 720 is stopped.

Figure 8:
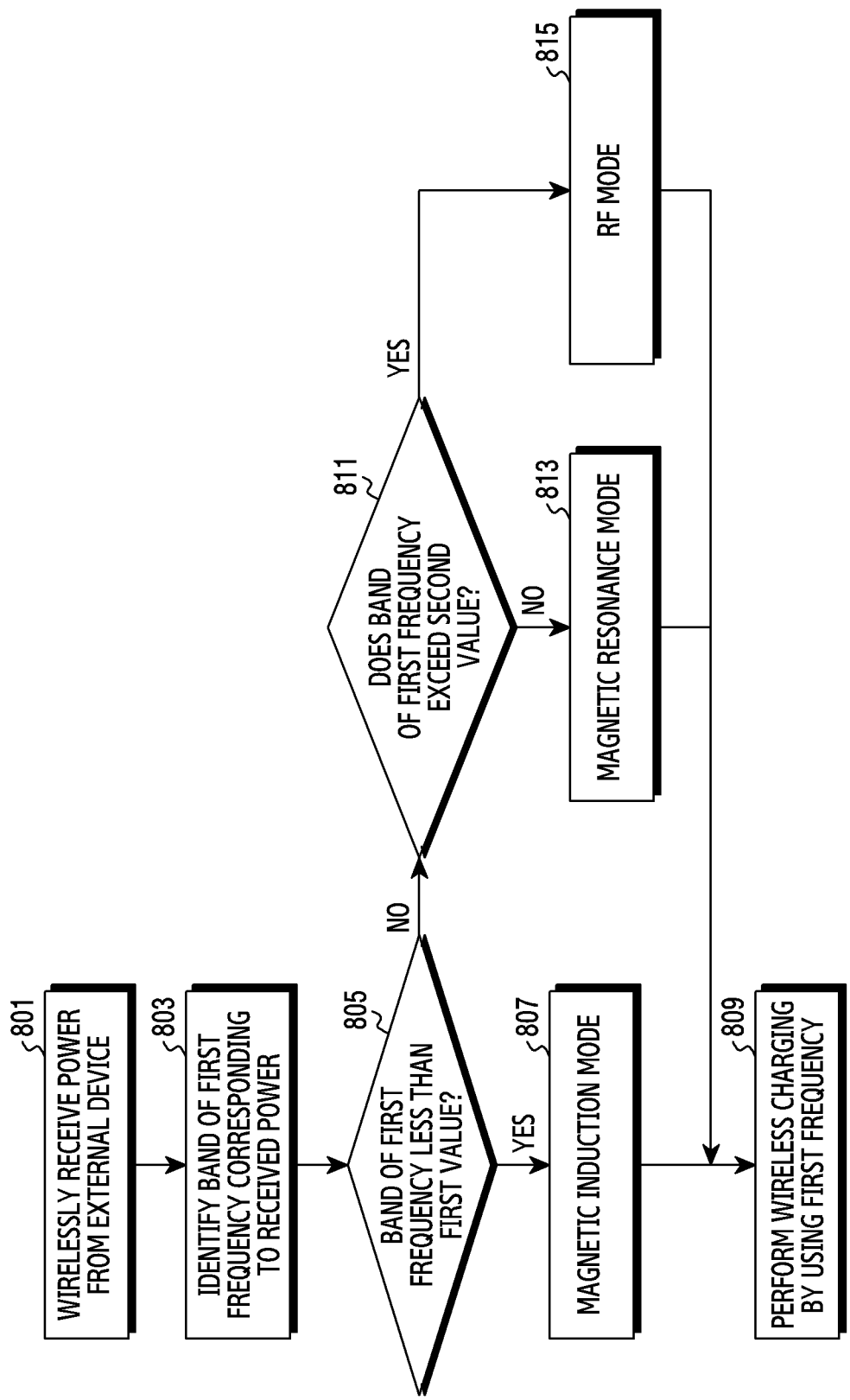
FIG. 8 illustrates a flowchart of an operation in which an electronic device selects a wireless charging mode according to an embodiment of the disclosure.

FIG. 8 illustrates a flowchart of an operation in which the electronic device 201 selects a wireless charging mode according to an embodiment of the disclosure.

A series of operations described below may be simultaneously or alternately performed by the electronic device 201, and some operations may be omitted or added.

In operation 801, the electronic device 201 may wirelessly receive power from the external device 211 through the wireless charging circuit 530. The power may mean power corresponding to a ping signal or a beacon signal. When the received power is AC power, the electronic device 201 may provide a DC power source by converting the AC power into DC power through the wireless charging circuit 530. For example, the AC power applied to a receiving coil of the electronic device 201 is applied to an NMOS transistor of a rectifier circuit and controls a gate voltage of the NMOS transistor, whereby it operates like a switch and converts the AC power into the DC power. The converted DC power may be applied to a low dropout regulator (LDO) through a Vrect terminal and be provided as a DC power source of a predetermined magnitude.

According to an embodiment, the electronic device 201 may boot up an IC of the electronic device 201 by using the provided DC power.

In operation 803, the electronic device 201 may identify a magnitude of a first frequency corresponding to the received power. For example, the electronic device 201 may identify a band of a first frequency corresponding to the received AC power.

According to one embodiment, the wireless charging mode used by the electronic device 201 may be different according to the band of the first frequency. For example, according to the band of the first frequency, the electronic device 201 may perform wireless charging by using one of a magnetic induction mode, a magnetic resonance mode, and an RF mode. The electronic device 201 may perform wireless charging by using the same or different antennas according to the wireless charging mode.

In operation 805, the electronic device 201 may determine whether the band of the first frequency is less than a first value. For example, the first value may be 1 MHz. According to one embodiment, when the band of the first frequency is less than the first value, the electronic device 201 may perform operation 807, and when the band of the first frequency is greater than or equal to the first value, the electronic device 201 may perform operation 811.

In operation 807, when the band of the first frequency is less than the first value, the electronic device 201 may determine the wireless charging mode as a magnetic induction mode. For example, when the band of the first frequency is less than 1 MHz, the electronic device 201 may determine the wireless charging mode as the magnetic induction mode.

In operation 811, when the band of the first frequency exceeds the first value, the electronic device 201 may determine whether the band of the first frequency exceeds a second value. The second value may be greater than the first value. For example, the first value may be 1 MHz and the second value may be 100 MHz.

According to one embodiment, when the band of the first frequency is greater than or equal to the first value and is less than or equal to the second value, the electronic device 201 may perform operation 813. According to one embodiment, when the band of the first frequency exceeds the second value, the electronic device 201 may perform operation 815.

In operation 813, when the band of the first frequency is greater than or equal to the first value and is less than or equal to the second value, the electronic device 201 may determine the wireless charging mode as a magnetic resonance mode. For example, when the band of the first frequency is greater than or equal to 1 MHz and is less than or equal to 100 MHz, the electronic device 201 may determine the wireless charging mode as the magnetic resonance mode.

In operation 815, when the band of the first frequency exceeds the second value, the electronic device 201 may determine the wireless charging mode as an RF mode. For example, when the band of the first frequency exceeds 100 MHz, the electronic device 201 may determine the wireless charging mode as the RF mode.

In operation 809, the electronic device 201 may perform wireless charging by using the first frequency, based on the determined wireless charging mode. The electronic device 201 may perform wireless charging by receiving power corresponding to the first frequency, based on the determined wireless charging mode. For example, the electronic device 201 may perform wireless charging by receiving the power corresponding to the first frequency from the external device 211, based on one wireless charging mode determined among the magnetic induction mode, the magnetic resonance mode, or the RF mode.

Figure 9:
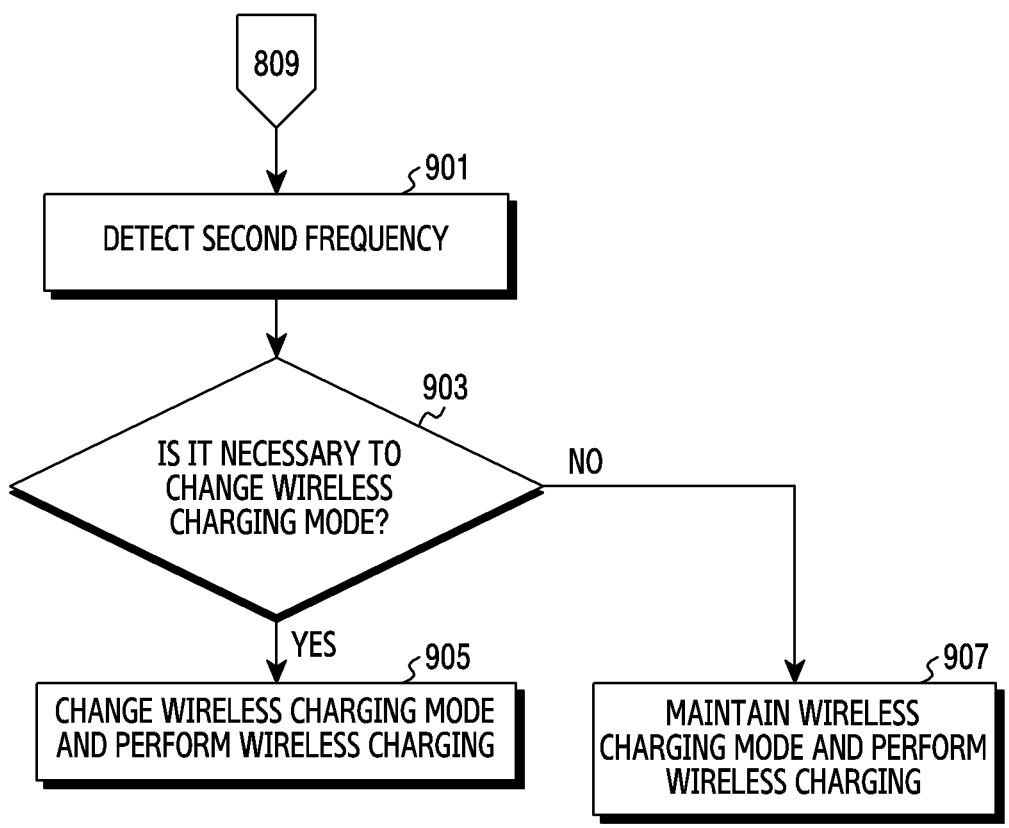
FIG. 9 illustrates a flowchart of an operation in which an electronic device determines whether to change a wireless charging mode according to an embodiment of the disclosure.

FIG. 9 illustrates a flowchart of an operation in which the electronic device 201 determines whether to change a wireless charging mode according to an embodiment of the disclosure.

A series of operations described below may be simultaneously or alternately performed by the electronic device 201, and some operations may be omitted or added.

In operation 901, while performing wireless charging by using the first wireless charging mode based on the first frequency, the electronic device 201 may detect a second frequency having a different magnitude from the first frequency. The electronic device 201 of an embodiment may monitor a second frequency band, while performing wireless charging by using a first wireless charging mode by receiving power corresponding to the first frequency from the external device 211. For example, the electronic device 201 may monitor the second frequency band every specified cycle, while performing wireless charging by using the first wireless charging mode.

In operation 903, in response to detecting the second frequency while the electronic device 201 performs wireless charging by using the first wireless charging mode corresponding to the first frequency, the electronic device 201 may determine whether to change the first wireless charging mode to a second wireless charging mode. For example, when the electronic device 201 detects the second frequency while performing wireless charging in the first wireless charging mode, the electronic device 201 may determine whether to change the first wireless charging mode to the second wireless charging mode, based on at least one of a wireless charging efficiency or an output voltage of the electronic device 201.

According to one embodiment, when it is determined to change the wireless charging mode based on at least one of the wireless charging efficiency or the output voltage of the electronic device 201, the electronic device 201 may perform operation 905, and when it is determined not to change the wireless charging mode, the electronic device 201 may perform operation 907.

According to one embodiment, when the electronic device 201 detects a frequency of 1 to 10 MHz band or a frequency of 100 MHz band or higher while performing wireless charging of a magnetic induction mode, the electronic device 201 may determine whether to change the wireless charging mode.

According to one embodiment, when the electronic device 201 detects the frequency of 1 to 10 MHz band while performing wireless charging of the magnetic induction mode, the electronic device 201 may change the wireless charging mode from the magnetic induction mode to the magnetic resonance mode, when an average charging efficiency for a specified time (e.g., 5 seconds) is less than a first reference value or a magnitude of the output voltage of the electronic device 201 is less than or equal to a second reference value. For example, the output voltage of the electronic device 201 may be a voltage outputted from the wireless charging circuit 530 of the electronic device 201 in order to charge the battery 540. The first reference value may be different according to the type of an electronic device performing wireless charging. For example, when the type of the electronic device is a terminal (e.g., a smart phone), the first reference value may be 45%. For another example, when the type of the electronic device is a smart watch, the first reference value may be 20%. For further example, when the type of the electronic device is a buzz cradle, the first reference value may be 30%. The second reference value may be different according to the type of the electronic device performing wireless charging. For example, when the type of the electronic device is a terminal (e.g., a smart phone), the second reference value may be 4.5V. For another example, when the type of the electronic device is a smart watch or a buzz cradle, the second reference value may be 4.2 to 4.5V.

According to one embodiment, when the electronic device 201 detects the frequency of 100 MHz band or higher while performing wireless charging of the magnetic induction mode, the electronic device 201 may change the wireless charging mode from the magnetic induction mode to the RF mode, when the average charging efficiency for the specified time (e.g., 5 seconds) is less than the first reference value or the magnitude of the output voltage of the electronic device 201 is less than or equal to the second reference value.

According to one embodiment, when the electronic device 201 detects the frequency of 100 to 300 kHz band or the frequency of 100 MHz band or higher while performing wireless charging of the magnetic resonance mode, the electronic device 201 may determine whether to change the wireless charging mode.

According to one embodiment, when the electronic device 201 detects the frequency of 100 to 300 kHz band while performing wireless charging of the magnetic resonance mode, the electronic device 201 may change the wireless charging mode from the magnetic resonance mode to the magnetic induction mode, when the average charging efficiency for the specified time (e.g., 5 seconds) is less than 50%.

According to one embodiment, when the electronic device 201 detects the frequency of 100 MHz band or higher while performing wireless charging of the magnetic resonance mode, the electronic device 201 may change the wireless charging mode from the magnetic resonance mode to the RF mode, when the average charging efficiency for the specified time (e.g., 5 seconds) is less than 1%.

According to one embodiment, when the electronic device 201 detects a frequency of 100 to 150 kHz band, a frequency of 1 to 10 MHz band, or a frequency of to 10 MHz band while performing wireless charging of the RF mode, the electronic device 201 may determine whether to change the wireless charging mode.

According to one embodiment, when the electronic device 201 detects the frequency of 100 to 150 kHz band while performing wireless charging of the RF mode, the electronic device 201 may change the wireless charging mode from the RF mode to the magnetic induction mode.

According to one embodiment, when the electronic device 201 detects the frequency of 1 to 10 MHz band while performing wireless charging of the RF mode, the electronic device 201 may change the wireless charging mode from the RF mode to the magnetic resonance mode.

According to one embodiment, when the electronic device 201 detects the frequency of 0.1 to 10 MHz band while performing wireless charging of the RF mode, the electronic device 201 may change the wireless charging mode from the RF mode to the magnetic induction mode.

According to one embodiment, when the distribution of a measured value of a wireless charging efficiency exceeds 15% while wireless charging is performed, the electronic device 201 may determine that the location of the electronic device 201 is changing. For example, when a second frequency is detected while wireless charging is performed in a first wireless charging mode using a first frequency, and the distribution of a measured value of a first wireless charging efficiency of the first wireless charging mode exceeds 15%, the electronic device 201 may change the first wireless charging mode to a second wireless charging mode using a second frequency. The electronic device 201 may measure a second wireless charging efficiency of the second wireless charging mode. The electronic device 201 may compare the measured value of the first wireless charging efficiency with a measured value of the second wireless charging efficiency. When the measured value of the first wireless charging efficiency is greater than the measured value of the second wireless charging efficiency, the electronic device 201 may change the second wireless charging mode to the first wireless charging mode. When the measured value of the first wireless charging efficiency is smaller than the measured value of the second wireless charging efficiency, the electronic device 201 may maintain the second wireless charging mode.

According to one embodiment, the electronic device 201 may periodically measure the wireless charging efficiency, and when the wireless charging efficiency continuously decreases, the electronic device 201 may determine that the change of the wireless charging mode is necessary. For example, when the wireless charging efficiency of the first wireless charging mode using the first frequency continues to drop, the electronic device 201 may determine that it is required to change the first wireless charging mode to another wireless charging mode (e.g., second wireless charging mode).

According to one embodiment, the electronic device 201 may detect at least one of a decrease of a wireless charging efficiency of the first wireless charging mode or a stop of wireless charging using the first wireless charging mode. In response to detecting at least one of the decrease of the wireless charging efficiency of the first wireless charging mode or the stop of wireless charging using the first wireless charging mode, the electronic device 201 may change the first wireless charging mode to the second wireless charging mode. For example, in response to detecting at least one of a decrease of a wireless charging efficiency of a magnetic induction mode or a stop of wireless charging of the magnetic induction mode, the electronic device 201 may change a wireless charging mode of the magnetic induction mode into a wireless charging mode of a magnetic resonance mode. The decrease of the wireless charging efficiency may include a case in which the wireless charging efficiency is continuously reduced for a specified time or a case in which the wireless charging efficiency is lower than a specified value. When the electronic device 201 changes the first wireless charging mode to the second wireless charging mode in response to detecting at least one of the decrease of the wireless charging efficiency of the first wireless charging mode or the stop of wireless charging using the first wireless charging mode, the electronic device 201 may omit an operation of determining whether to change the first wireless charging mode to the second wireless charging mode.

According to one embodiment, in response to a decrease of a wireless charging efficiency of the first wireless charging mode, the electronic device 201 may stop wireless charging of the first wireless charging mode. In response to a stop of wireless charging of the first wireless charging mode, the electronic device 201 may receive a signal (e.g., a ping signal or a beacon signal) related to the second wireless charging mode from the external device 211. In response to receiving the signal related to the second wireless charging mode, the electronic device 201 may change the first wireless charging mode to the second wireless charging mode. For example, in response to receiving the ping signal related to the second wireless charging mode, the electronic device 201 may change the wireless charging mode from the magnetic resonance mode to the magnetic induction mode. For another example, in response to receiving the beacon signal related to the second wireless charging mode, the electronic device 201 may change the wireless charging mode from the magnetic induction mode to the magnetic resonance mode.

In operation 905, the electronic device 201 may change from the first wireless charging mode to the second wireless charging mode and perform wireless charging. For example, the electronic device 201 may change a wireless charging mode from the magnetic induction mode to the magnetic resonance mode and perform wireless charging. For another example, the electronic device 201 may change the wireless charging mode from the magnetic induction mode to the RF mode and perform wireless charging. For further example, the electronic device 201 may change the wireless charging mode from the magnetic resonance mode to the RF mode. The electronic device 201 may also change the wireless charging mode in reverse of the above examples.

In operation 907, the electronic device 201 may maintain the currently executed wireless charging mode and perform wireless charging. For example, the electronic device 201 may maintain the currently operated magnetic induction mode and perform wireless charging. For another example, the electronic device 201 may maintain the currently operated magnetic resonance mode and perform wireless charging.

According to one embodiment, when the electronic device 201 detects a second frequency while performing wireless charging based on a first wireless charging mode being based on a first frequency, the electronic device 201 may measure the efficiency of a second wireless charging mode being based on a second frequency. When the efficiency of the second wireless charging mode based on the second frequency is higher than the efficiency of the first wireless charging mode based on the first frequency, the electronic device 201 may change the wireless charging mode and perform wireless charging. When the efficiency of the first wireless charging mode is higher than that of the second wireless charging mode, the electronic device 201 may maintain the wireless charging mode and perform wireless charging.

According to one embodiment, an electronic device (e.g., the electronic device 101 of FIG. 1, the electronic device 201 of FIG. 2, the electronic device 301 of FIG. 3, the electronic device 402 of FIG. 4, the electronic device 201 of FIG. 5) may include a wireless charging circuit (e.g., the wireless charging circuit 530 of FIG. 5), and a processor (e.g., the processor 510 of FIG. 5) operatively connected to the wireless charging circuit 530. The processor 510 may wirelessly receive power from an external device (e.g., the external device 211, 212 of FIG. 2, the external device 302 of FIG. 3, the external device 401 of FIG. 4) through the wireless charging circuit 530, based on a first wireless charging mode using a first frequency, detect a second frequency rather than the first frequency through the wireless charging circuit 530, and, in response to detecting the second frequency, determine whether to change the first wireless charging mode to a second wireless charging mode, based on at least one of a wireless charging efficiency or an output voltage of the electronic device (e.g., the electronic device 101 of FIG. 1, the electronic device 201 of FIG. 2, the electronic device 301 of FIG. 3, the electronic device 401 of FIG. 4, the electronic device 201 of FIG. 5).

According to one embodiment, the processor 510 may wirelessly receive power from the external device (e.g., the external device 211, 212 of FIG. 2, the external device 302 of FIG. 3, the external device 401 of FIG. 4) through the wireless charging circuit 530, identify a band of the first frequency corresponding to the received power, and determine a wireless charging mode as the first wireless charging mode, based on the identified band of the first frequency.

According to one embodiment, the wireless charging mode may include a magnetic induction mode, a magnetic resonance mode, and an RF mode.

According to one embodiment, the wireless charging efficiency may include an average charging efficiency for a specified time.

According to one embodiment, the processor 510 may, in response to detecting the second frequency, identify a band of the second frequency, and determine an element for determining whether to change the wireless charging mode, based on the band of the second frequency.

According to one embodiment, the element may include an average charging efficiency for a specified time and an output voltage of the electronic device (e.g., the electronic device 101 of FIG. 1, the electronic device 201 of FIG. 2, the electronic device 301 of FIG. 3, the electronic device 402 of FIG. 4, the electronic device 201 of FIG. 5).

According to one embodiment, the processor 510 may determine the element as an average charging efficiency for a specified time when the band of the second frequency is 100 MHz or more, and change the wireless charging mode from a magnetic induction mode to an RF mode when the average charging efficiency for the specified time is less than a first reference value.

According to one embodiment, the processor 510 may determine the element as an average charging efficiency for a specified time or an output voltage of the electronic device (e.g., the electronic device 101 of FIG. 1, the electronic device 201 of FIG. 2, the electronic device 301 of FIG. 3, the electronic device 402 of FIG. 4, the electronic device 201 of FIG. 5) when the band of the second frequency is 1 to 10 MHz, and change the wireless charging mode from a magnetic induction mode to a magnetic resonance mode when the average charging efficiency for the specified time is less than a first reference value or the output voltage is less than or equal to a second reference value.

According to one embodiment, the first reference value and the second reference value may be determined differently according to the type of the electronic device (e.g., the electronic device 101 of FIG. 1, the electronic device 201 of FIG. 2, the electronic device 301 of FIG. 3, the electronic device 402 of FIG. 4, the electronic device 201 of FIG. 5).

According to one embodiment, the type of the electronic device (e.g., the electronic device 101 of FIG. 1, the electronic device 201 of FIG. 2, the electronic device 301 of FIG. 3, the electronic device 402 of FIG. 4, the electronic device 201 of FIG. 5) may include a smart phone, a smart watch, and a wireless earphone cradle.

According to one embodiment, the processor 510 may perform wireless charging, based on a magnetic resonance mode using the first frequency, detect the second frequency through the wireless charging circuit 530, identify a band of the second frequency in response to detecting the second frequency, and change a magnetic resonance mode to an RF mode when a band of the second frequency is 100 MHz or more, when an average charging efficiency for a specified time is less than a first reference value.

According to one embodiment, the processor 510 may perform wireless charging, based on a magnetic resonance mode using the first frequency, detect the second frequency through the wireless charging circuit 530, identify a band of the second frequency in response to detecting the second frequency, and change a magnetic resonance mode to a magnetic induction mode when a band of the second frequency is 100 to 300 kHz, when an average charging efficiency for a specified time is less than a first reference value.

According to one embodiment, the processor 510 may perform wireless charging, based on an RF mode using the first frequency, detect the second frequency through the wireless charging circuit 530, identify a band of the second frequency in response to detecting the second frequency, and change an RF mode to a magnetic induction mode when the band of the second frequency is 100 to 150 kHz.

According to one embodiment, the processor 510 may perform wireless charging, based on an RF mode using the first frequency, detect the second frequency through the wireless charging circuit 530, identify a band of the second frequency in response to detecting the second frequency, and change an RF mode to a magnetic resonance mode when the band of the second frequency is 1 to 10 MHz.

According to one embodiment, the processor 510 may perform wireless charging, based on an RF mode using the first frequency, detect the second frequency through the wireless charging circuit 530, identify a band of the second frequency in response to detecting the second frequency, and change an RF mode to a magnetic induction mode or a magnetic resonance mode when the magnitude of the second frequency is 0.1 to 10 MHz.

According to one embodiment, an electronic device (e.g., the electronic device 101 of FIG. 1, the electronic device 201 of FIG. 2, the electronic device 301 of FIG. 3, the electronic device 402 of FIG. 4, the electronic device 201 of FIG. 5) may include a wireless charging circuit 530, and a processor 510 operatively connected to the wireless charging circuit 530. The processor 510 may wirelessly receive power from an external device (e.g., the external device 211, 212 of FIG. 2, the external device 302 of FIG. 3, the external device 401 of FIG. 4) through the wireless charging circuit 530, identify a band of a frequency corresponding to the received power, determine a wireless charging mode, based on the identified band of the frequency, and wirelessly receive power from the external device through the wireless charging circuit by using the frequency, based on the determined wireless charging mode and charge a battery of the electronic device.

According to one embodiment, the external device may include a wireless charger (e.g., the external device 211, 212 of FIG. 2, the external device 302 of FIG. 3, the external device 401 of FIG. 4).

According to one embodiment, when the identified band of the frequency is less than a first reference value, the processor 510 may determine the wireless charging mode as a magnetic induction mode.

According to one embodiment, when the identified band of the frequency is greater than or equal to the first reference value and is less than a second reference value, the processor 510 may determine the wireless charging mode as a magnetic resonance mode, and when the identified band of the frequency exceeds the second reference value, the processor 510 may determine the wireless charging mode as an RF mode.

Figure 10:
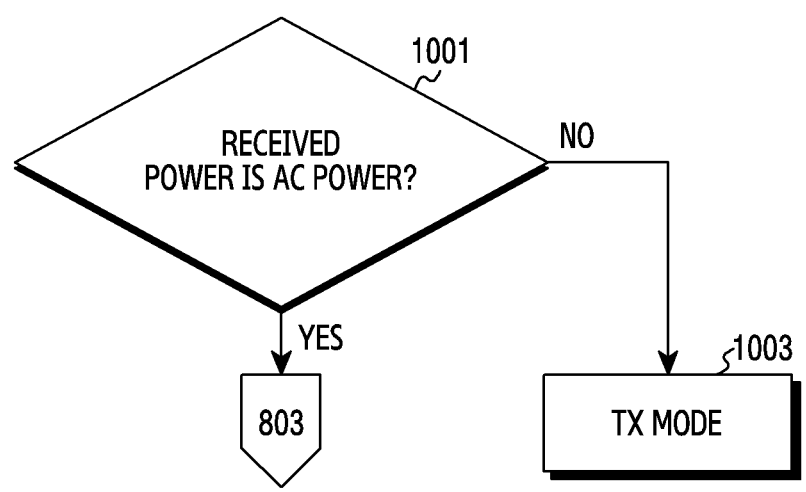
FIG. 10 illustrates a flowchart of an operation of determining whether an electronic device is in a Tx mode according to an embodiment of the disclosure.

FIG. 10 illustrates a flowchart of an operation of determining whether the electronic device 201 is in a Tx mode according to an embodiment of the disclosure.

A series of operations described below may be simultaneously or alternately performed by the electronic device 201, and some operations may be omitted or added.

In operation 1001, the electronic device 201 may determine whether received power is AC power. According to one embodiment, when the received power is the AC power, the electronic device 201 may perform operation 803, and when the received power is not the AC power, the electronic device 201 may perform operation 1003.

In operation 1003, when the received power is not the AC power, the electronic device 201 may perform wireless charging in the Tx mode. The Tx mode may mean a wireless power transmission mode. For example, the electronic device 201 operating in the Tx mode may mean the electronic device 201 which operates in the wireless power transmission mode or as a wireless power transmitter. When the electronic device 201 operates in the Tx mode, the electronic device 201 may wirelessly transmit power to another electronic device. For example, the first electronic device 201 corresponding to a smart phone may wirelessly transmit power to the third electronic device 203 corresponding to a smart watch.

Effects obtainable in the disclosure are not limited to the effects mentioned above, and other effects not mentioned may be clearly understood by those skilled in the art to which the disclosure pertains from the description below.

Methods of the embodiments described in the claims or specification of the disclosure may be implemented in the form of hardware, software, or a combination of hardware and software.

When implemented in software, a computer-readable storage medium storing one or more programs (software modules) may be presented. One or more programs stored in the computer-readable storage medium are configured for execution by one or more processors in an electronic device. The one or more programs include instructions that cause the electronic device to execute methods of the embodiments described in the claims or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), or other optical storage devices, magnetic cassettes. Or, it may be stored in a memory composed of a combination of some or all of these. Also, each configuration memory may be included in multiple numbers.

Also, the program may be stored in an attachable storage device that may be accessed through a communication network such as the Internet, an intranet, a local area network (LAN), a wide area network (WAN), or a storage area network (SAN), or a communication network consisting of a combination thereof. Such a storage device may be connected to a device performing an embodiment of the disclosure through an external port. Also, a separate storage device on a communication network may be connected to a device performing an embodiment of the disclosure.

In the specific embodiments of the disclosure described above, components included in the disclosure are expressed in singular or plural numbers according to the specific embodiments presented. However, singular or plural expressions are selected appropriately for the presented situation for convenience of description, and the disclosure is not limited to singular or plural components, and even components expressed in the plural number are composed of the singular number, or even components expressed in the singular number may be composed of the plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing instructions;
   a wireless charging circuit; and
   a processor,
   wherein the instructions that, when executed by the processor, cause the electronic device to:
      wirelessly receive power from an external device through the wireless charging circuit, based on a first wireless charging mode using a first frequency,
      detect a second frequency rather than the first frequency through the wireless charging circuit, while receiving power using the first frequency,
      in response to detecting the second frequency, determine whether to change the first wireless charging mode to a second wireless charging mode, change the first wireless charging mode to the second wireless charging mode in case of that a wireless charging efficiency is less than a defined threshold, and maintain the first wireless charging mode in case of that the wireless charging efficiency is greater than the defined threshold.

2. The electronic device of claim 1, wherein the instructions that, when executed by the processor, further cause the electronic device to:

wirelessly receive power from the external device through the wireless charging circuit, identify a band of the first frequency corresponding to the received power, and determine a wireless charging mode as the first wireless charging mode, based on the identified band of the first frequency.

3. The electronic device of claim 2, wherein the wireless charging mode comprises a magnetic induction mode, a magnetic resonance mode, and a radio frequency (RF) mode.

4. The electronic device of claim 1, wherein the wireless charging efficiency comprises an average charging efficiency for a specified time.

5. The electronic device of claim 1, wherein the instructions that, when executed by the processor, further cause the electronic device to:

in response to detecting the second frequency, identify a band of the second frequency, and determine an element for determining whether to change the wireless charging mode, based on the band of the second frequency.

6. The electronic device of claim 5, wherein the element comprises an average charging efficiency for a specified time and an output voltage of the electronic device.

7. The electronic device of claim 5, wherein the instructions that, when executed by the processor, further cause the electronic device to:

when the band of the second frequency is 100 MHz or more, determine the element as an average charging efficiency for a specified time, and when the average charging efficiency for the specified time is less than a first reference value, change the wireless charging mode from a magnetic induction mode to an RF mode.

8. The electronic device of claim 5, wherein the instructions that, when executed by the processor, further cause the electronic device to:

when the band of the second frequency is 1 to 10 MHz, determine the element as an average charging efficiency for a specified time or an output voltage of the electronic device, and when the average charging efficiency for the specified time is less than a first reference value or the output voltage is less than or equal to a second reference value, change the wireless charging mode from a magnetic induction mode to a magnetic resonance mode.

9. The electronic device of claim 8, wherein the first reference value and the second reference value are determined differently according to a type of the electronic device.

10. The electronic device of claim 9, wherein the type of the electronic device comprises a smart phone, a smart watch, and a wireless earphone cradle.

11. The electronic device of claim 1, wherein the instructions that, when executed by the processor, further cause the electronic device to:

perform wireless charging, based on a magnetic resonance mode using the first frequency, detect the second frequency through the wireless charging circuit, in response to detecting the second frequency, identify a band of the second frequency, and when a band of the second frequency is 100 MHz or more, when an average charging efficiency for a specified time is less than a first reference value, change a magnetic resonance mode to an RF mode.

12. The electronic device of claim 1, wherein the instructions that, when executed by the processor, further cause the electronic device to:

perform wireless charging, based on a magnetic resonance mode using the first frequency, detect the second frequency through the wireless charging circuit, in response to detecting the second frequency, identify a band of the second frequency, and when a band of the second frequency is 100 to 300 kHz and when an average charging efficiency for a specified time is less than a first reference value, change a magnetic resonance mode to a magnetic induction mode.

13. The electronic device of claim 1, wherein the instructions that, when executed by the processor, further cause the electronic device to:

perform wireless charging, based on an RF mode using the first frequency, detect the second frequency through the wireless charging circuit, in response to detecting the second frequency, identify a band of the second frequency, and when the band of the second frequency is 100 to 150 kHz, change an RF mode to a magnetic induction mode.

14. The electronic device of claim 1, wherein the instructions that, when executed by the processor, further cause the electronic device to:

perform wireless charging, based on an RF mode using the first frequency, detect the second frequency through the wireless charging circuit, in response to detecting the second frequency, identify a band of the second frequency, and when the band of the second frequency is 1 to 10 MHZ, change an RF mode to a magnetic resonance mode.

15. The electronic device of claim 1, wherein the instructions that, when executed by the processor, further cause the electronic device to:

perform wireless charging, based on an RF mode using the first frequency, detect the second frequency through the wireless charging circuit, in response to detecting the second frequency, identify a band of the second frequency, and when a magnitude of the second frequency is 0.1 to 10 MHz, change an RF mode to a magnetic induction mode or a magnetic resonance mode.

16. An electronic device comprising:

memory storing instructions;

a wireless charging circuit; and a processor, wherein the instructions that, when executed by the processor, cause the electronic device to:

wirelessly receive power from an external device through the wireless charging circuit, identify a band of a frequency corresponding to the received power, while receiving power using another band of a frequency, determine whether to change a wireless charging mode, based on the identified band of the frequency, change the wireless charging mode to another wireless charging mode in case of that a wireless charging efficiency is less than a defined threshold, and in case of that the wireless charging efficiency is greater than the defined threshold, wirelessly receive power from the external device through the wireless charging circuit by using the frequency.

17. The electronic device of claim 16, wherein the wireless charging mode comprises a magnetic induction mode, a magnetic resonance mode, and a radio frequency (RF) mode.

18. The electronic device of claim 16, wherein the external device includes a wireless charger.

19. The electronic device of claim 16, wherein the instructions that, when executed by the processor, further cause the electronic device to:

when the identified band of the frequency is less than a first reference value, determine the wireless charging mode as a magnetic induction mode.

20. The electronic device of claim 19, wherein the instructions that, when executed by the processor, further cause the electronic device to:

when the identified band of the frequency is greater than or equal to the first reference value and is less than a second reference value, determine the wireless charging mode as a magnetic resonance mode, and when the identified band of the frequency exceeds the second reference value, determine the wireless charging mode as an RF mode.

* * * * *